US008465159B2

(12) United States Patent
Iwanaga (10) Patent No.: US 8,465,159 B2
(45) Date of Patent: Jun. 18, 2013

(54) PROJECTOR AND METHOD OF CONTROLLING A LIGHT SOURCE FOR USE WITH THE PROJECTOR

(75) Inventor: Masakuni Iwanaga, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/401,677

(22) Filed: Feb. 21, 2012

(65) Prior Publication Data

US 2012/0147335 A1     Jun. 14, 2012

Related U.S. Application Data

(60) Division of application No. 13/206,792, filed on Aug. 10, 2011, which is a continuation of application No. 11/529,673, filed on Sep. 28, 2006, now Pat. No. 8,021,001.

(30) Foreign Application Priority Data

Sep. 29, 2005    (JP) ................. 2005-284561

(51) Int. Cl.
     *G03B 21/00*       (2006.01)
     *G03B 21/20*       (2006.01)
     *G03B 21/26*       (2006.01)
     *G09G 5/00*        (2006.01)
     *G09G 5/02*        (2006.01)

(52) U.S. Cl.
     USPC ................. 353/85; 353/31; 353/94; 345/613; 345/694

(58) Field of Classification Search
     USPC .................. 353/30–31, 85, 94, 122; 345/207, 345/613, 694
     See application file for complete search history.

(56) References Cited

U.S. PATENT DOCUMENTS

| 6,115,016 A | 9/2000 | Yoshihara et al. |
| 6,961,038 B2 | 11/2005 | Yoshinaga et al. |
| 7,019,736 B2 | 3/2006 | Allen et al. |
| 7,052,138 B2 | 5/2006 | Matsui |

(Continued)

FOREIGN PATENT DOCUMENTS

| EP | 1 347 652 A2 | 9/2003 |
| EP | 1 489 853 A2 | 12/2004 |

(Continued)

OTHER PUBLICATIONS

Japanese Office Action (and English translation thereof) dated Aug. 16, 2011 in counterpart Japanese Application No. 2005-284561.

(Continued)

*Primary Examiner* — Tony Ko
*Assistant Examiner* — Jori S Reilly-Diakun
(74) *Attorney, Agent, or Firm* — Holtz, Holtz, Goodman & Chick, P.C.

(57) ABSTRACT

A projector has a storage unit storing data on a plurality of different light emission patterns each occurring in a period based on a plurality of different-colored lights, wherein each light emission pattern corresponds to a respective one of a plurality of different projection conditions of a color image. An acquiring unit acquires a present projection condition of the color image, and a controller controls a light emission operation of the plurality of different-colored light emitting elements in the period in accordance with data on a light emission pattern corresponding to the present projection condition of the color image.

21 Claims, 11 Drawing Sheets

U.S. PATENT DOCUMENTS

| | | | |
|---|---|---|---|
| 7,092,563 B2 | 8/2006 | Shiratani | |
| 7,303,284 B2 | 12/2007 | Imade | |
| 7,377,654 B2 | 5/2008 | Miyazawa et al. | |
| 7,607,784 B2 | 10/2009 | Shimaoka et al. | |
| 2001/0022613 A1 | 9/2001 | Matsui et al. | |
| 2003/0179192 A1* | 9/2003 | Allen et al. | 345/207 |
| 2003/0231260 A1 | 12/2003 | Pate et al. | |
| 2004/0036668 A1 | 2/2004 | Nakanishi | |
| 2005/0017990 A1 | 1/2005 | Yoshida | |

FOREIGN PATENT DOCUMENTS

| | | |
|---|---|---|
| JP | 2001-174912 A | 6/2001 |
| JP | 2003-241714 A | 8/2003 |
| JP | 2004-140800 A | 5/2004 |
| JP | 2004-151650 A | 5/2004 |
| JP | 2005-043854 A | 2/2005 |
| JP | 2005-234097 A | 9/2005 |
| WO | WO 2005/073952 A1 | 8/2005 |

OTHER PUBLICATIONS

International Preliminary Report on Patentability and Written Opinion dated Dec. 1, 2006, issued in International Application No. PCT/JP2006/319905 filed Sep. 28, 2006, all in the English language, 14 sheets.

European Office Action dated Oct. 29, 2012 (in English) issued in counterpart European Application No. 06 811 243.2.

* cited by examiner

PROJECTOR AND METHOD OF CONTROLLING A LIGHT SOURCE FOR USE WITH THE PROJECTOR

CROSS-REFERENCE TO RELATED APPLICATIONS

This is a Divisional Application of U.S. application Ser. No. 13/206,792, filed Aug. 10, 2011, which application is a Continuation Application of U.S. application Ser. No. 11/529,673, filed Sep. 28, 2006 now U.S. Pat. No. 8,021,001, which application is based upon and claims the benefit of priority from prior Japanese Patent Application No. 2005-284561, filed Sep. 29, 2005, the entire contents of all of which are incorporated herein by reference.

BACKGROUND OF THE INVENTION

1. Field of the Invention

The present invention relates to a projector of a field sequential color type and a method of controlling alight source for use with the projector.

2. Description of the Related Art

In the past, in meetings or presentations projectors are used which convert an image signal received from an image supply device such as a computer to projection light, which is then magnified and projected onto a screen or a white board. Such projectors include the ones of a type called a field sequential color type which is capable of projecting a color image. In a projector of such type, a color wheel of red (R), green (G) and blue (B) filter sections arranged therein in the rotating direction thereof is rotated, and light from a light source is caused to passthrough the R, G and B sections sequentially, thereby producing corresponding colored light. These light are then caused to enter liquid crystal or a display device such as a micromirror array, thereby displaying and projecting a full color image.

Published Unexamined Japanese Patent Application 2004-151650 discloses a projector which does not produce R, G and B light from a single light source, but uses a light source of three different color (R, G and B) LEDs (Light Emitting Diodes) which are switched on sequentially in a time-divisional manner in a period. The Application also discloses that if the switch-on time of the green LED is set longer than those of the red and blue LEDs and a light flux quantity of the green light is set to 60-80 percent of the whole light flux quantity, a white projected image will be obtained.

Although this projector can provide a white projected image, the switch-on time of each color light of the light source is fixed in a light emission period of the light source. Thus, there is naturally a limit to improvement of the quality of the projected images.

BRIEF SUMMARY OF THE INVENTION

According to an embodiment of the present invention, a projector including a light source of a plurality of different-colored light emitting elements for projecting a color image in a field sequential color system, the projector comprises:

a storage unit which stores data on a plurality of different light emission patterns each occurring in a period based on a plurality of different-colored lights emitted by the plurality of different-colored light emitting elements, each pattern corresponding to a respective one of a plurality of different projection conditions of the color image;

an acquiring unit which acquires a present projection condition of the color image;

a reader which reads from the storage unit data on a light emission pattern corresponding to the present projection condition of the color image acquired by the acquiring unit; and a controller which controls a light emission operation of the plurality of different light emitting elements in a period in accordance with the read data on a light emission pattern.

According to another embodiment of the present invention, in a projector including a light source of a plurality of different-colored light emitting elements for projecting a color image in a field sequential color system, a method of controlling a light emission operation of the plurality of light emission elements of the light source in a period, the method comprises:

acquiring a present projection condition of the color image;

reading data on a light emission pattern corresponding to the acquired present projection condition from a storage unit which stores data on a plurality of different light emission patterns for a period; and controlling a light emission operation of the plurality of different light emitting elements in a period in accordance with the read data on a light emission pattern.

According to an embodiment of the present invention, a software program product embodied in a computer readable medium for performing the above method of controlling a light emission.

The above and other objects, features and advantages of the present invention will become apparent in the following detailed description of the present embodiment and modifications thereof when read in conjunction with the accompanying drawings wherein the same reference numerals denote like or similar parts throughout the several views.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

An embodiment of a projector according to the present invention will now be described with reference to the accompanying drawings.

First Embodiment

Figure 1:
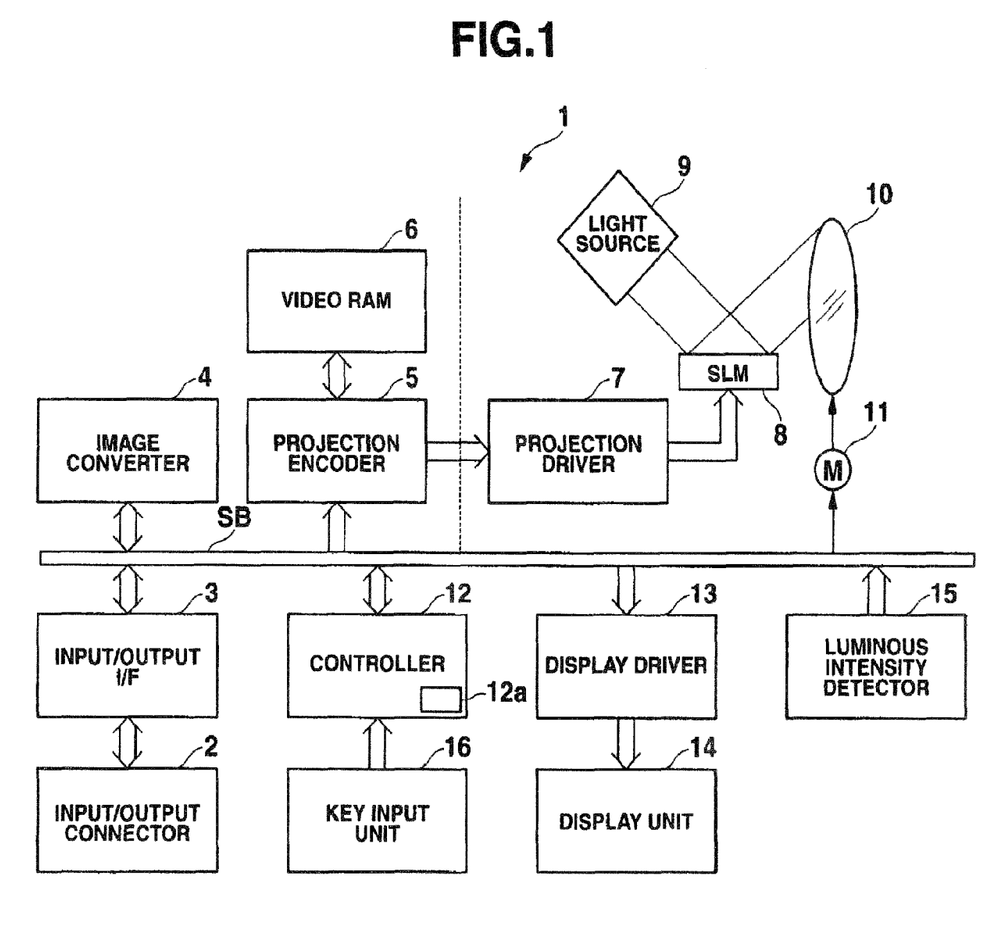
FIG. 1 is a block diagram of a projector which is used in common in all embodiments of the present invention.

FIG. 1 is a block diagram of a projector which is used in common in two embodiments of the present invention. Referring to FIG. 1, the projector 1 has an input/output connector 2 provided on a body (not shown) and including a USB terminal that receives/delivers image data from/to an external device such as, for example, a computer, and a mini D-SUB terminal, an S terminal and an RCA terminal for reception of video images.

Various standard image signals received through the input/output connector 2 are standardized to image signals of a predetermined format by an image converter 4 through an input/output interface (I/F) 3 and a system bus SB and then forwarded to a projection encoder 5. The encoder 5 loads and stores a respective received image signal on and in a video RAM 6. The encoder 5 also produces a video signal based on the image signal stored in the video RAM 6 and forwards it to a projection driver 7.

The projection driver 7 drives a spatial light modulator (SLM) 8 for displaying purposes at a predetermined frame rate, for example of 30 frames/second, based on the received image signal. When light emitted by a light source 9, which will be described in detail later, is applied to the spatial light modulator 8, an optical image is formed by a reflection from the modulator 8 and projected onto a screen (not shown) via a projection lens unit 10. The projection lens unit 10, which is composed of lenses, and has zoom and focus functions, is driven by a lens motor 11 so as to adjust the zoom and focus positions as required.

Figure 2:
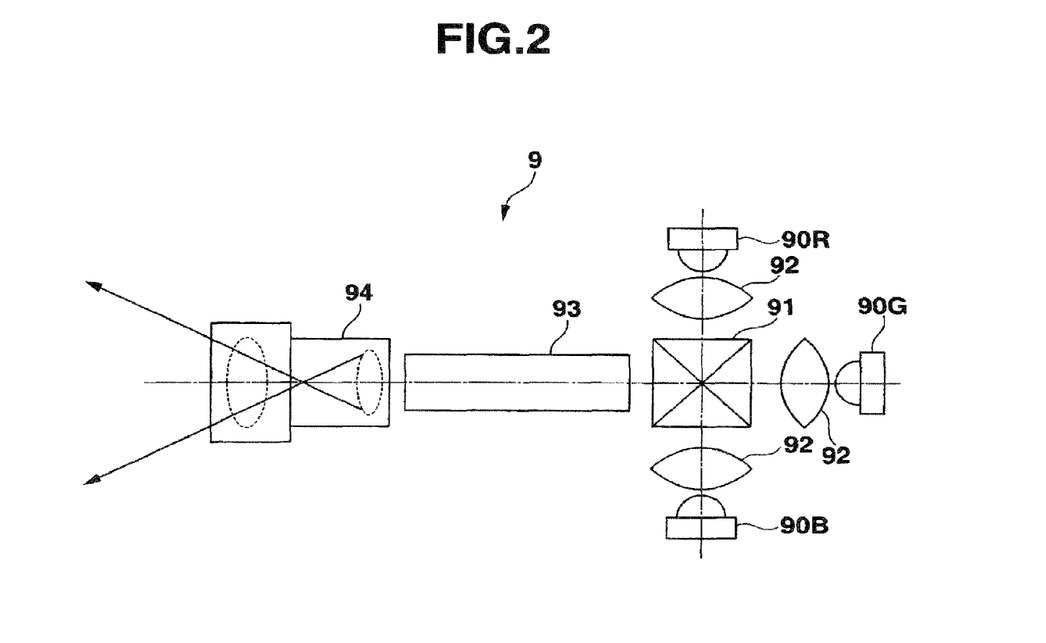
FIG. 2 illustrates the construction of a light source of the projector of FIG. 1.

FIG. 2 shows the construction of the light source 9, which includes a dichroic mirror 91 and LEDs 90R, 90G and 90B that emit red, green and blue lights, respectively, arranged around the dichroic mirror 91. Light fluxes from the LEDs 90R, 90G and 90B are focused individually by a condenser lens 92 on the dichroic mirror 91, in which the focused light fluxes are then combined. These combined light fluxes are then guided into and reflected repeatedly within a light tunnel 93, thereby providing an equalized light flux. This flux is then projected through a light source lens 94 against the spatial optical modulator 8.

The components of the projector 1 are controlled by the controller 12, which mainly includes a CPU, a ROM 12a that permanently stores an operation program to be executed by the CPU, and a RAM to be used as a working memory.

The controller 12 is connected to the input/output interface 3, the image converter 4, the projection encoder 5, a display driver 13, and a luminous intensity detector 15 through the system bus SB. The display driver 13 drives a display unit 14 composed of a liquid crystal panel in accordance with commands from the controller 12, thereby causing the display unit 14 to display an operative state of the projector 1 and various guide messages. The luminous intensity detector 15 includes an optical sensor such as a photoresistor or a photocell, and an amplifier and forwards a detection signal indicative of a luminous intensity of the projector's environment to the controller 12.

The controller 12 is connected to a key input unit 16 that comprises various operation buttons (not shown) including a power source button. When any one of the operation buttons is operated, the key input unit 16 delivers a corresponding operation signal to the controller 12.

The ROM 12a of the controller 12 has stored data indicative of inventive light emission patterns for the LEDs 90R, 90G and 90B of the light source 9 in a single period corresponding to predetermined luminous intensities and used for controlling purposes later, which will be described later in detail. In the present embodiment, the number of predetermined luminous intensity levels is three and the respective luminous intensity levels are determined depending on an emission performance of projection light of the light source 9; that is, a level 1 that represents a luminous intensity in a range suitable for projection of an image, a level 2 that represents a luminous intensity in a range somewhat higher than at the level 1, and a level 3 that represents a luminous intensity in a range higher than at the level 2.

Figure 3:
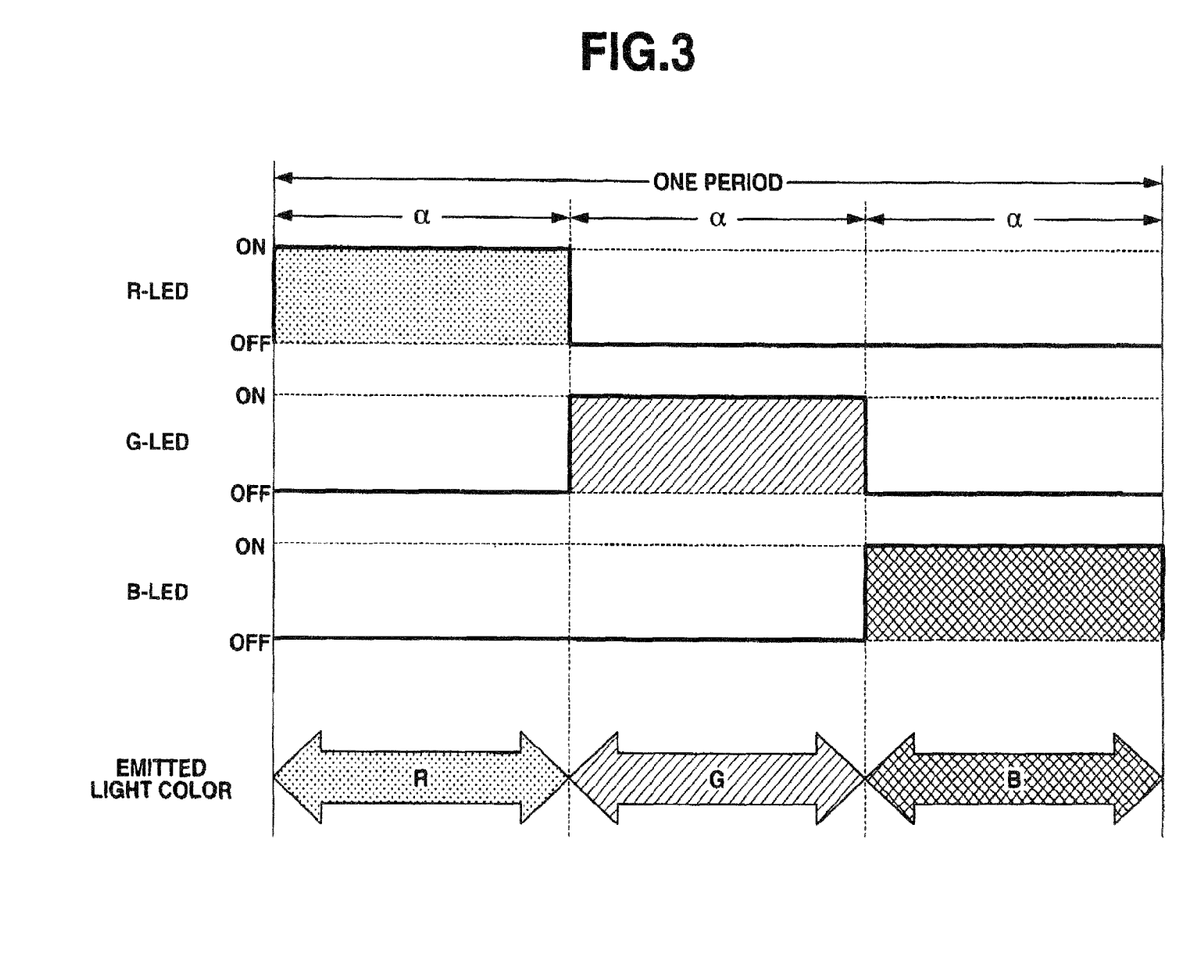
FIG. 3 illustrates a light emission pattern corresponding to a luminous intensity level 1 in the first embodiment.
Figure 4:
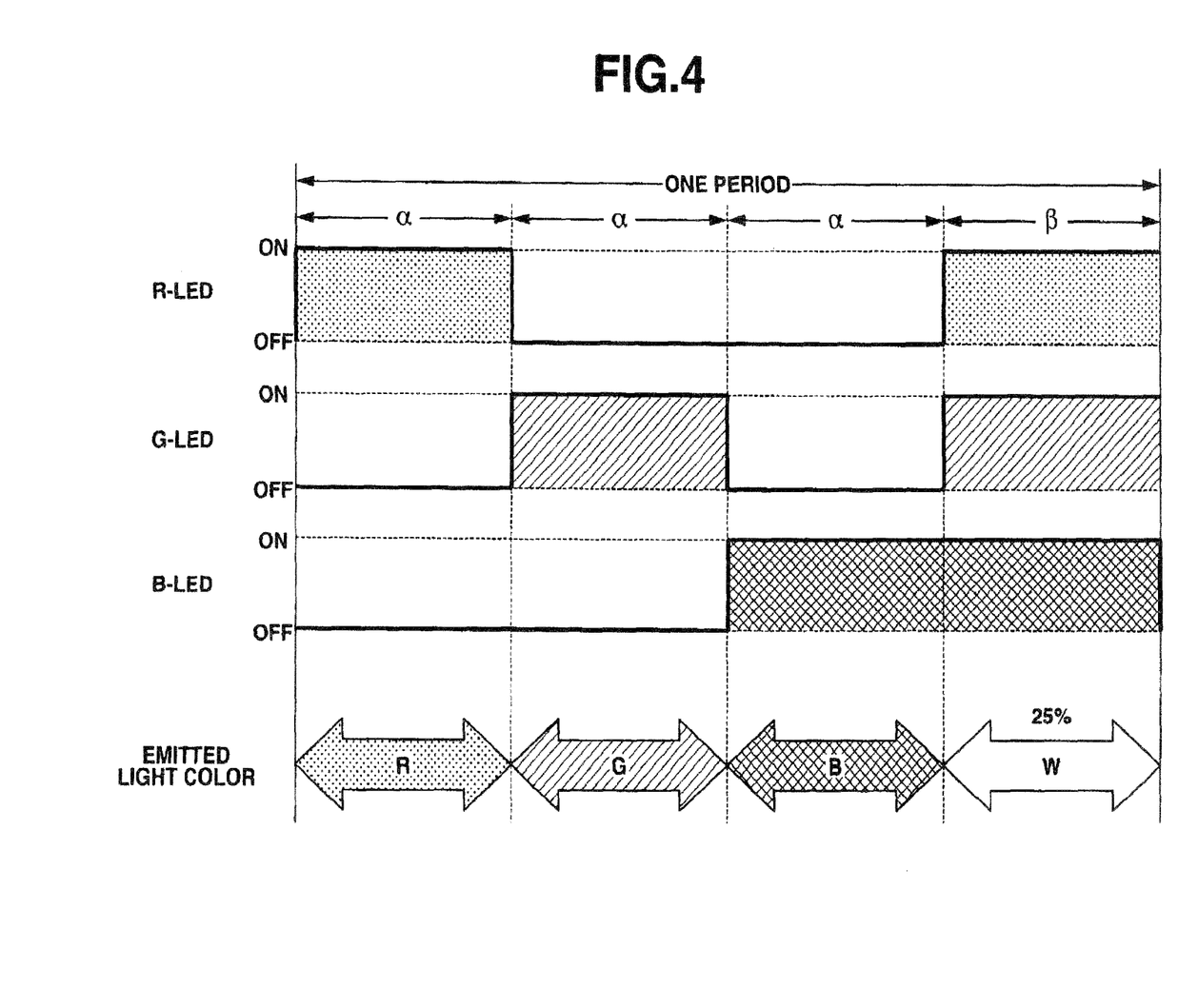
FIG. 4 illustrates a light emission pattern corresponding to a luminous intensity level 2.
Figure 5:
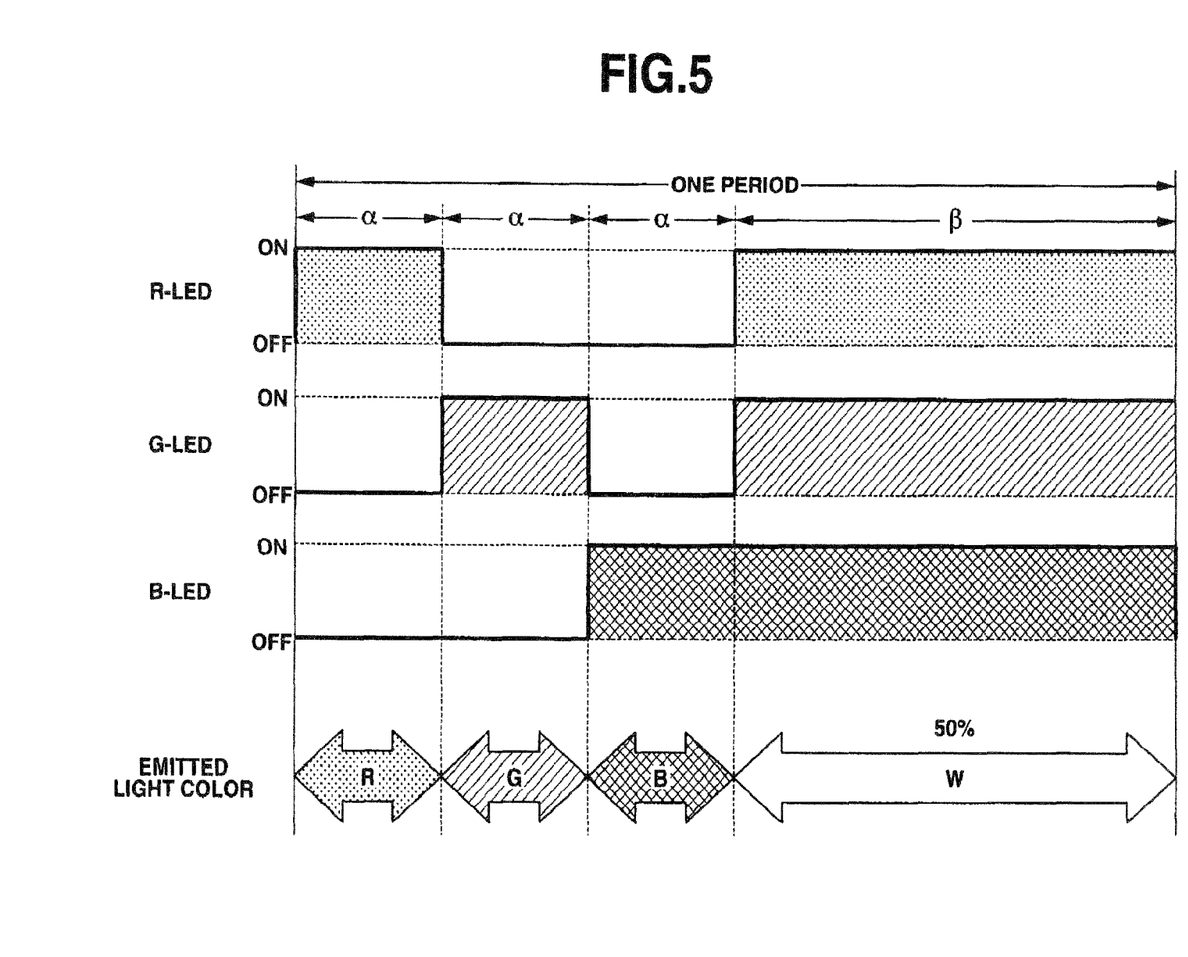
FIG. 5 illustrates a light emission pattern corresponding to a luminous intensity level 3.

Light emission patterns corresponding to the respective luminous intensity levels are determined as follows. FIGS. 3-5 show light emission patterns corresponding to the luminous intensity levels 1-3, respectively.

As shown in FIG. 3, the light emission pattern corresponding to the luminous intensity level 1 includes only successive light emission durations a for which the LEDs 90R (or R-LED), 90G (or G-LED) and 90B (or B-LED) are sequentially switched on, thereby causing the light source 9 to emit R (red), G (green) and B (blue) lights in a time-divisional manner.

As shown in FIG. 4, the light emission pattern corresponding to the luminous intensity level 2 includes successive light emission durations a for which the LEDs 90R (or R-LED), 90G (or G-LED) and 90B (or B-LED) are sequentially switched on, and then the last light emission duration β for which the LEDs 90R (or R-LED), 90G (or G-LED) and 90B (or B-LED) are simultaneously switched on, thereby causing the light source 9 to emit R, G, B and W (white) lights sequentially in a time-divisional manner. The percentage of the W light duration in a single period is 25%.

As shown in FIG. 5, like the light emission pattern of the luminous intensity level 2 the light emission pattern corresponding to the luminous intensity level 3 includes successive light emission durations α for which the LEDs 90R (or R-LED), 90G (or G-LED) and 90B (or B-LED) are sequentially switched on, and then the last light emission duration β for which the LEDs 90R (or R-LED), 90G (or G-LED) and 90B (or B-LED) are simultaneously switched on, thereby causing the light source 9 to emit R, G, B and W (white) lights sequentially in a time-divisional manner. The percentage of each of the R, G and B light durations in a single period is 16.6 (=⅙×100) %, and the percentage of the W light duration in the single period is 50%.

Figure 6:
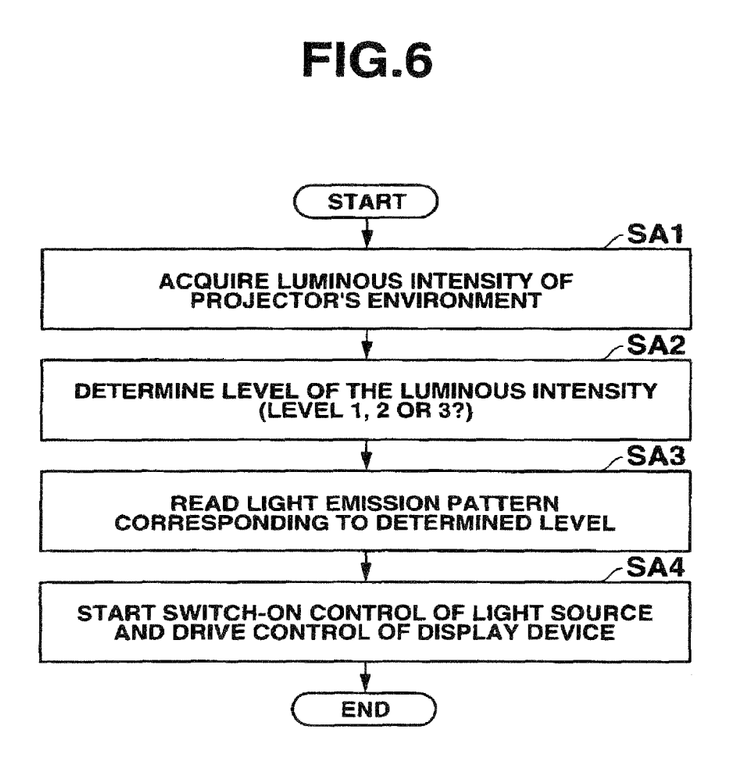
FIG. 6 is a flowchart indicative of a light source control process to be performed by a controller of the embodiment.

Operation of the inventive projector 1 will be described next. FIG. 6 is a flowchart indicative of a light-source control process to be executed by the controller 12 when or after a user turns on the power source switch and then performs a predetermined operation. Herein, it is assumed that image data received, for example, from a personal computer involves a color image.

The controller 12 starts to operate in accordance with the turning on of the power source. First, the controller 12 acquires data on the luminous intensity of the projector's environment based on a detection signal from the luminous intensity detector 15 (step SA1). The controller 12 then determines to which of the luminous intensity levels the acquired luminous intensity corresponds (step SA2), and reads out corresponding light emission pattern data from the ROM 12a (step SA3). The controller 12 then starts switch-on control of the LEDs 90R, 90G and 90B of the light source 9 and drive control of the spatial light modulator 8 in a synchronous manner (step SA4) and then terminates this process.

Thus, if the luminous intensity of the projector's environment is under the projection conditions at the luminous intensity level 1 when the power source is turned on, an image similar to a conventional one is projected in three primary R, G and B lights. If the luminous intensity of the projector's environment is under the projection conditions at the luminous intensity level 2 or 3, an image is projected in three primary R, G and B lights and W light. Thus, a high-luminosity image of somewhat reduced saturation is projected. As the luminous intensity of the projector's environment is higher, the luminosity of the projected image is higher.

Thus, when the place where the image projection is performed is at a luminous intensity suitable for image projection (or dark), the percentage of the W light emission duration in a period is zeroed, thereby obtaining a projected image of usual saturation. When the place where the image projection is performed is relatively bright, the percentage of the W light emission duration, or the luminosity, is increased, which provides a plain projected image, thereby restricting a reduction in the contrast of the image due to external light. That is, a light emission pattern suitable for the luminous intensity of the image projection environment is obtained automatically in a switched manner and hence an improved quality image is projected.

While in the embodiment the luminous intensities of the projector's environment are illustrated as separated into three levels and hence the percentages of W light durations in the period of the light source operation are illustrated as adjusted automatically to 0, 25 and 50%, respectively, they may be adjusted automatically to finer numerical values. While the luminous intensity of the projector's environment is illustrated as detected and acquired as the luminous intensity of the projection environment, the luminous intensities of an object of image projection such as a screen or a white board before and after any particular image is projected onto the object of image projection may be detected, and the luminous intensity of the projector's environment may be determined or acquired based on a difference between the detected luminous intensities.

While in the embodiment a light emission pattern is illustrated in which the LEDs 90R (or R-LED), 90G (or G-LED) and 90B (B-LED) are once switched on sequentially in corresponding durations in a period in order to emit light including W (white) light from the light source, a different light emission pattern such as shown next may be employed.

Figure 7:
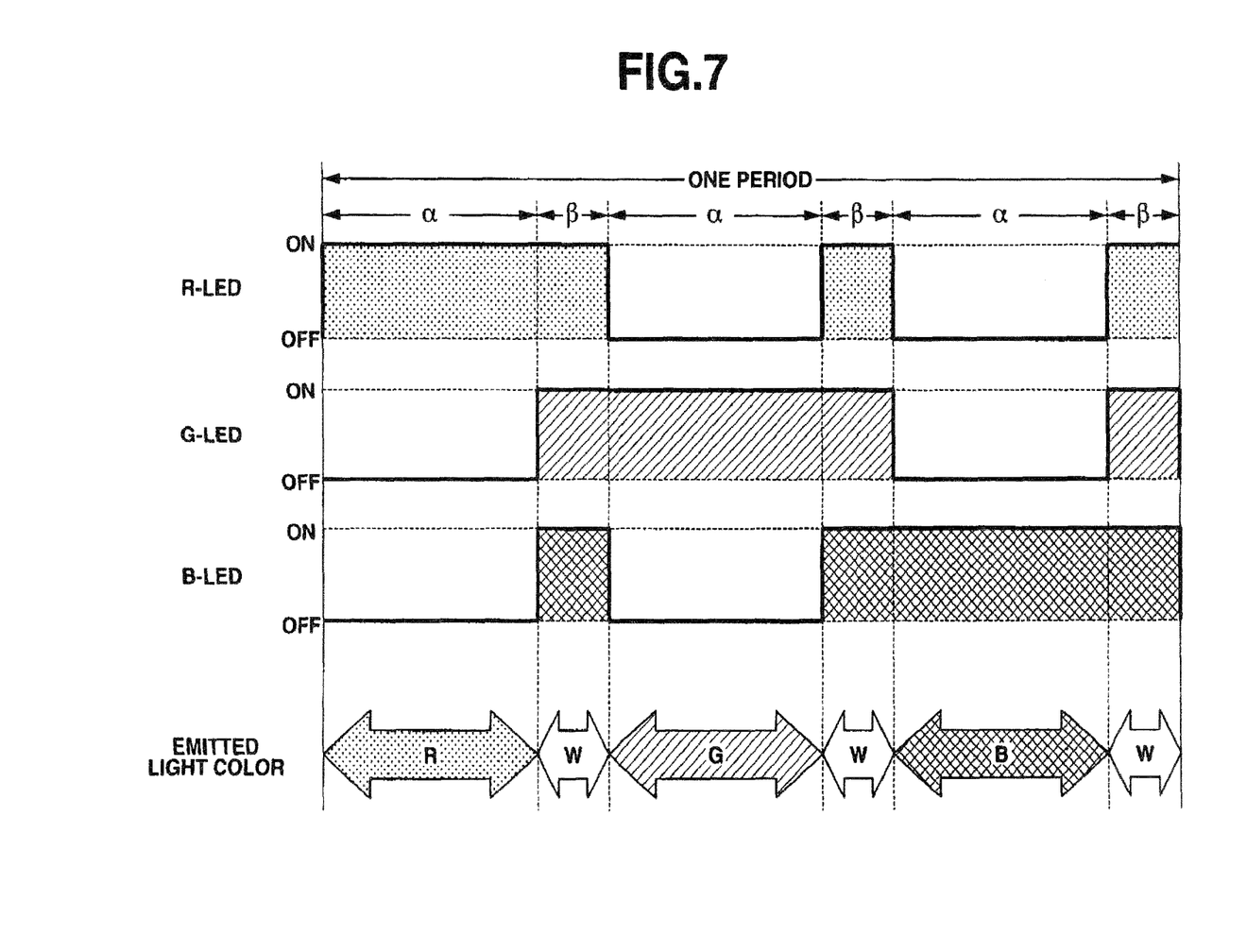
FIG. 7 illustrates a light emission pattern to be used in a modification.

FIG. 7 is a modification of the present embodiment indicative of a light emission pattern in which R, W, G, W, B and W light are emitted sequentially in successive durations $\alpha$, $\beta$, $\alpha$, $\beta$, $\alpha$ and $\beta$ of a period. In this case, the percentage of the sum of simultaneous light emission durations $\beta$ in a period may be changed or adjusted depending on the luminous intensity of the projector's environment, thereby producing advantageous effects similar to those of the embodiment. Distribution of the simultaneous light emission durations $\beta$ serves to reduce flickering of the projected image due to an increase in the luminosity of the image, and also reduce the respective light emission durations of the LEDs 90R, 90G and 90B, thereby restricting a rise in their temperature (due to their heat generation).

While the above description illustrates that the light emission patterns of the LEDs 90R, 90G and 90B of the light source 9 include durations for which the W light is emitted, the ROM 12a may store data indicative of a light emission pattern in which the light source emits no W light, which will be described next.

Figure 8:
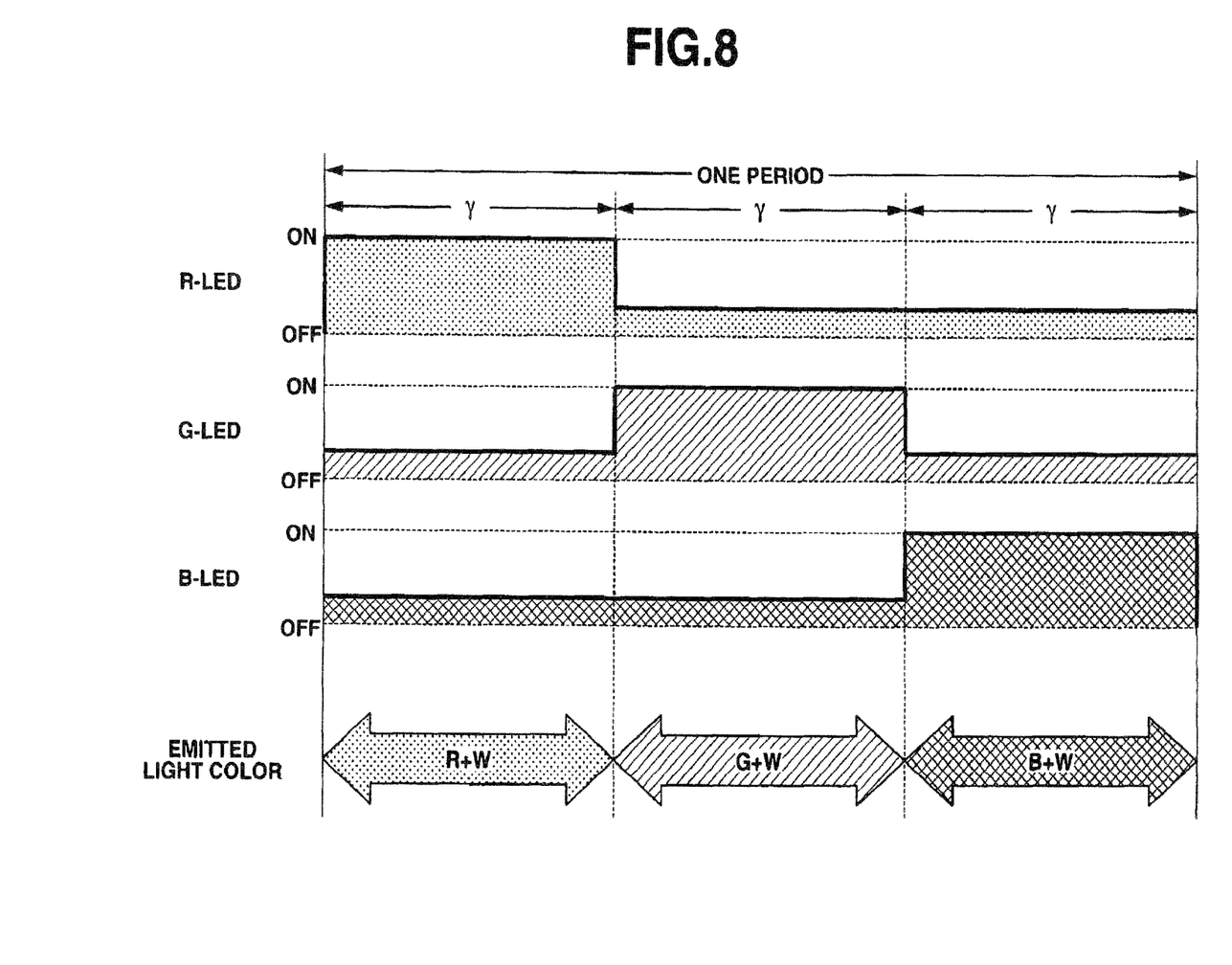
FIG. 8 illustrates a light emission pattern to be used in another modification.

FIG. 8 shows another modification in which light emission pattern the LEDs 90R, 90G and 90B are once switched on sequentially at a full luminosity for their durations $\gamma$ in this order in a period and the other two LEDs (for example, 90G and 90B) excluding the particular LED (for example, 90R) that emits corresponding colored light at the full luminosity emit corresponding colored light at a predetermined luminosity lower than the full luminosity, which is hereinafter referred to as an auxiliary light luminosity, for the duration for which the particular LED emits its light. Light emission patterns different only in auxiliary light luminosity from FIG. 8 modification pattern may be stored in correspondence with different luminous intensity levels in the ROM 12a. A higher auxiliary light luminosity is set in a light emission pattern corresponding to a higher luminous intensity. A zero auxiliary light luminosity is set in a light emission pattern corresponding to the lowest luminous intensity at level 1, or the other two LEDs excluding the particular LED that emits corresponding colored light at the maximum luminosity may be switched off. It is noted that the luminosity of each LED will be determined depending on a current flowing through that LED and that the spatial light modulator 8 will be driven irrespective of the luminous intensity of the projector's environment.

When the place where the image projection is performed is relatively bright, the auxiliary light luminosity is increased depending on the luminous intensity of the environment of the object of image projection, thereby projecting a high luminous-intensity image of somewhat reduced reproducibility of colors. As the environment of the projector and hence the place where the image projection is performed are brighter, the luminosity of the projected image is higher. Thus, a plain projected image is obtained in which a reduction in the contrast thereof due to external light is restricted.

Second Embodiment

In a second embodiment, the ROM 12a of the projector's controller 12 stores data on a light emission pattern similar to that of FIG. 3 in the first embodiment (hereinafter referred to as a usual light emission pattern), a yellow emphasis light emission pattern of FIG. 9, and a complementary color emphasis light emission pattern of FIG. 10 as the light emission patterns of the LEDs 90R, 90G and 90B for a period.

Figure 9:
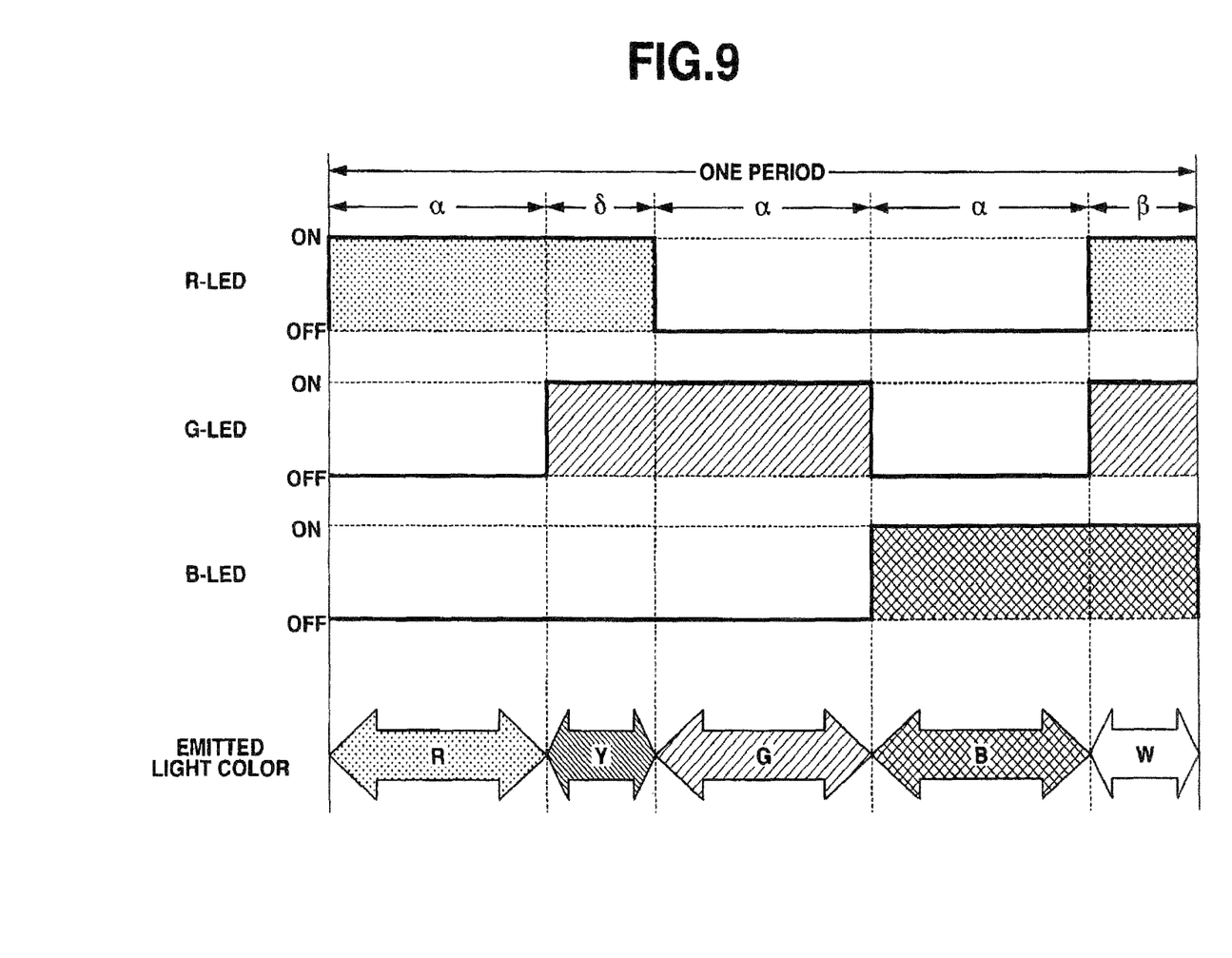
FIG. 9 illustrates a yellow emphasis light emission pattern to be used in a second embodiment.

As shown in FIG. 9, in the yellow emphasis light emission pattern the R-LED; the two R- and G-LEDs; the G-LED; the B-LED; and the three R-, G- and B-LEDs are switched on sequentially for successive durations $\alpha$, $\delta$, $\alpha$, $\alpha$, and $\beta$ of a period, thereby emitting R, Y, G, B and W light sequentially in a time-divisional manner. The duration times $\beta$ and $\delta$ are equal and shorter than the duration $\alpha$.

Figure 10:
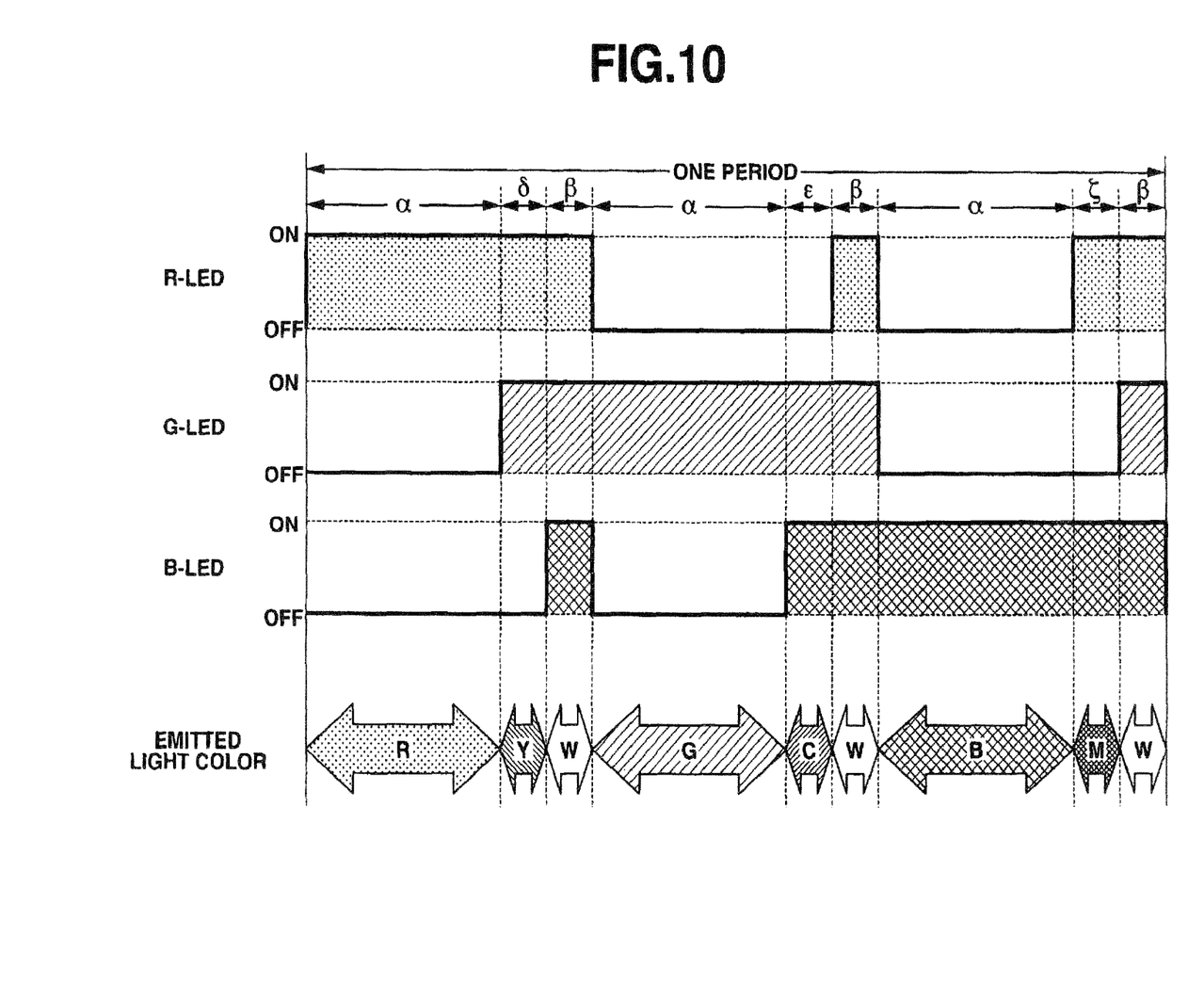
FIG. 10 illustrates a complementary color emphasis light emission pattern to be used in the second embodiment.

As shown in FIG. 10, in the complementary-color emphasis light emission pattern the R-LED; the two R- and G-LEDs; the three R-, G- and B-LEDs; the G-LED; the two G- and B-LEDs; the three R-, G- and B-LEDs; the B-LED; the two R- and B-LEDs; and the three R-, G- and B-LEDs are switched on sequentially for successive durations $\alpha$, $\delta$, $\beta$, $\alpha$, $\epsilon$, $\beta$, $\alpha$, $\zeta$ and $\beta$ of a period, thereby emitting R, Y, W, G, C (Cyan), W, B, M (Magenta) and W light sequentially in a time-divisional manner. The durations $\delta$, $\beta$, $\delta$, and $\zeta$ are equal and shorter than the duration $\alpha$.

Figure 11:
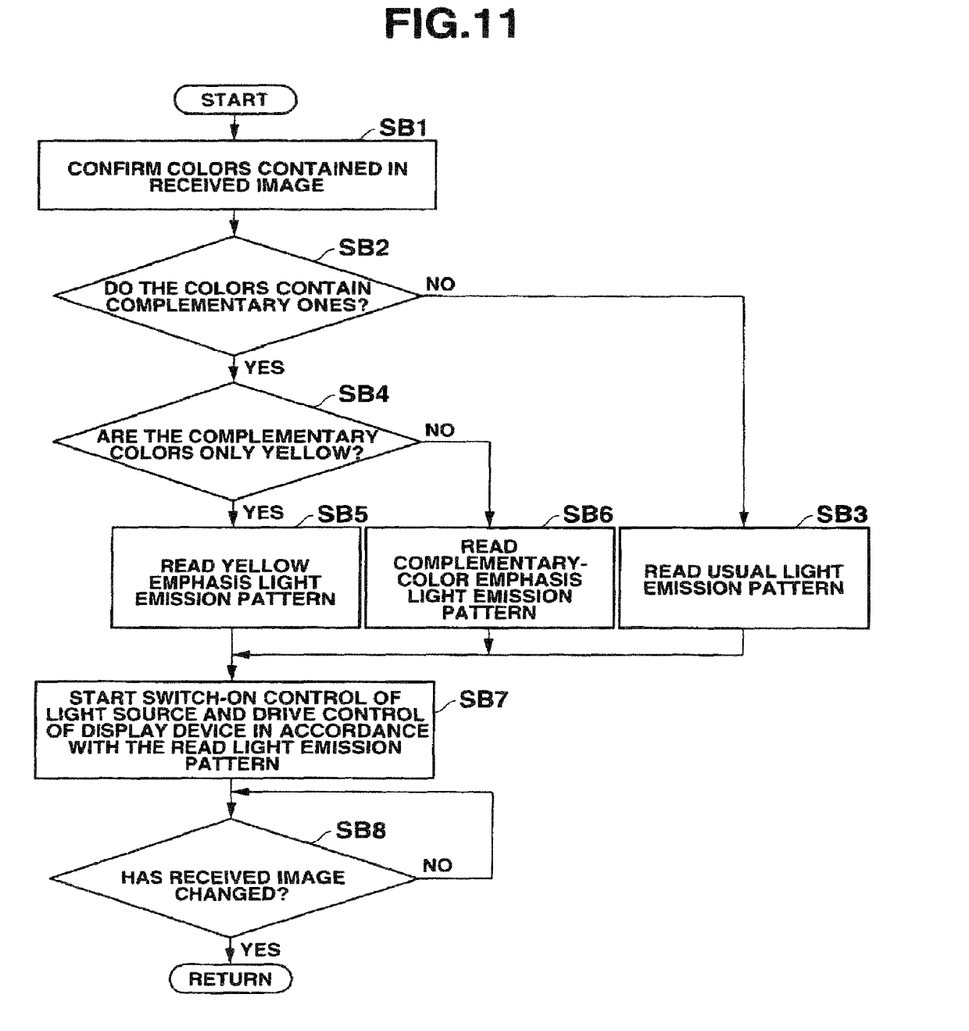
FIG. 11 is a flowchart indicative of a light-source control process to be performed by the controller in the second embodiment.

Next, operation of the projector in the second embodiment will be described. FIG. 11 is a flowchart indicative of a light source control process to be performed by the controller 12 while a color image based on image data received, for example, from a personal computer is being projected onto a screen.

The controller 12 starts the processing along with the beginning of the image projection. The controller 12 first confirms colors contained in the received image (to be projected) (step SB1). If the image contains no complementary colors (No in step SB1), the controller 12 reads data on the usual light emission pattern from the ROM 12a (step SB3), and then starts switch-on control of the LEDs 90R, 90G and 90B of the light source 9 in accordance with the usual light emission pattern and drive control of the spatial light modulator 8 in a synchronous manner (step SB7), thereby projecting an image similar to a conventional image in three primary color or R, G and B light.

When the received image contains complementary colors, which are only yellow (steps SB2 and SB4), the controller 12 reads data on the yellow emphasis light emission pattern from the ROM 12a (step SB5), and then starts light emission control of the LEDs 90R, 90G and 90B of the light source 9 in accordance with the yellow emphasis light emission pattern and drive control of the spatial light modulator 8 in a synchronous manner (step SB7).

Since in this case the light source 9 emits light including Y light, a projected image is obtained whose yellow part is improved in color reproducibility. In addition, since the light emitted by the light source 9 includes W light at the same percentage in duration as the Y light, the luminous intensity of the projected image is not lowered, but the color reproducibility of a yellow part of the image is improved.

When the received image contains a plurality of different complementary colors including yellow or otherwise a plurality of different complementary colors other than yellow (YES in step SB2, NO in step SB4), the controller 12 reads data on the complementary color emphasis light emission pattern from the ROM 12a (step SB6), and then starts light emission control of the LEDs 90R, 90G and 90B of the light source 9 in accordance with the read complementary color emphasis light emission pattern and drive control of the spatial light modulator 8 in a synchronous manner (step SB7).

Since in this case the light emitted by the light source 9 includes Y, C and M light complementary to R, G and B light, a projected image is obtained which is improved in the color reproducibility of the complementary parts thereof. In addition, since the light emitted by the light source 9 contains W light at the same percentage in duration as each of the plurality of complementary colors, the whole luminous intensity of the projected image is not lowered, but the color reproducibility of the complementary color parts of the image is improved. In addition, since the simultaneous light emission durations $\beta$ for which the W light is emitted from the light source 9 are distributed in the respective durations $\alpha$, flickering of the image which would otherwise occur is reduced. Furthermore, since the duration time for which each of the LEDs 90R, 90G and 90B emits corresponding light is short and hence a rise in the temperature of these LEDs due to their generated heat is restricted.

After starting the light emission control of the LEDs 90R, 90G and 90B of the light source 9 in accordance with any particular one of the light emission patterns mentioned above and drive control of the spatial optical modulator 8, the controller 12 returns to step SB1, thereby repeating the process of FIG. 11 each time a different image is received (YES in step SB8).

As described above, in the present embodiment the light emission pattern of the LEDs 90R, 90G and 90B of the light source 9 can be changed automatically in a switched manner to a light emission pattern suitable for the composition of colors contained in a received image to be projected. Thus, an improved quality image can be projected onto a screen or the like.

While in the present embodiment the yellow emphasis light emission pattern (see FIG. 9) and the complementary color emphasis light emission pattern (see FIG. 10) are illustrated as including a simultaneous light emission duration $\beta$ for which the W light is emitted from the light source 9, thereby preventing the luminous intensity of a projected image from being lowered, the color reproducibility of a yellow or a complementary color part of the image can be improved even when the simultaneous light emission durations are eliminated.

Although not shown, the ROM 12a may store data indicative of a plurality of different usual light emission patterns each including a different simultaneous light emission duration $\beta$ in a period, similar to those of FIGS. 4 and 5 of the first embodiment, a plurality of different yellow emphasis light emission patterns each including a different simultaneous light emission duration (percentage) $\beta$ in a period, and a plurality of different complementary-color emphasis light emission patterns in correspondence with a like number of luminous intensity levels such that the controller 12 reads from the ROM 12a a light emission pattern corresponding to a level of the luminous intensity of the projector's environment detected and stored when the power source is turned on at steps SB3, SB5 and SB6. In this case, since the light emission pattern of the LEDs 90R, 90G and 90B of the light source 9 can be switched automatically to a light emission pattern suitable for both the composition of colors contained in the received image (to be projected) and the luminous intensity of the projector's environment, an improved quality image can be projected.

The present invention has been described with reference to several exemplary embodiments and modifications. However, it will be readily apparent to those skilled in the art that it is possible to embody the invention in specific forms other than those of the exemplary embodiments and modifications described above. This may be done without departing from the spirit of the invention. These exemplary embodiments and modifications are merely illustrative and should not be considered restrictive in any way. The scope of the invention is given by the appended claims, rather than the preceding description, and all variations and equivalents which fall within the range of the claims are intended to be embraced therein.

What is claimed is:

1. A projector apparatus that includes light emitting elements of red, blue, and green, and projects a color image in a field sequential color system, the projector apparatus comprising:

a memory configured to store complementary color light emission pattern information and usual color light emission pattern information for a period of light emission by the light emitting elements, the complementary color light emission pattern information including one of a first duration in which only the light emitting elements of red and green simultaneously emit light, a second duration in which only the light emitting elements of green and blue simultaneously emit light, and a third duration in which only the light emitting elements of red and blue simultaneously emit light, and the usual color light emission pattern information including a duration other than the first duration, the second duration, and the third duration;

an acquiring unit configured to acquire information indicative of whether color components of the color image include a complementary color component;

a reading unit configured to read the complementary color light emission pattern information when the acquiring unit acquires information indicating that the color components of the color image comprise a complementary color component and to read the usual color light emission pattern information when the acquiring unit acquires information indicating that the color components of the color image do not comprise a complementary color component; and a controller configured to control a light emission pattern for a period of light emission by the light emitting elements based on the color light emission pattern information read by the reading unit.

2. The projector apparatus according to claim 1, wherein:
the memory is configured to store first light emission pattern information as the complementary color light emission pattern information for a period of light emission by the light emitting elements, the first light emission pattern information comprising the first duration and not the second duration and the third duration; and the reading unit is configured to read the first light emission pattern information from the memory when the information acquired by the acquiring unit indicates that the color components of the color image include yellow as a complementary color component.

3. The projector apparatus according to claim 1, wherein:
the memory is configured to further store second light emission pattern information as the complementary color light emission pattern information for a period of light emission by the light emitting elements, the second light emission pattern information comprising the first duration, the second duration, and the third duration; and the reading unit is configured to read the second light emission pattern information from the memory when the information acquired by the acquiring unit indicates that the color components of the color image include a complementary color component other than yellow.

4. The projector apparatus according to claim 1, wherein the first duration, the second duration, and the third duration are between fourth durations in which one of the light emitting elements emits light.

5. The projector apparatus according to claim 4, wherein the first duration, the second duration, and the third duration are shorter than the fourth durations.

6. The projector apparatus according to claim 1, wherein the complementary color light emission pattern information further comprises a fifth duration in which the light emitting elements of red, green, and blue simultaneously emit light.

7. The projector apparatus according to claim 6, further comprising:
a second acquiring unit configured to acquire a luminous intensity of a projection environment of the color image; and an adjusting unit configured to adjust a time period of the fifth duration.

8. The projector apparatus according to claim 7, wherein the second acquiring unit is configured to acquire a luminous intensity before and after projection of a color image and to detect the luminous intensity of the projection environment of the color image based on a difference between the luminous intensities acquired before and after projection.

9. The projector apparatus according to claim 6, wherein the fifth duration is between fourth durations in which one of the light emitting elements emits light.

10. The projector apparatus according to claim 9, wherein the fifth duration is shorter than the fourth durations.

11. The projector apparatus according to claim 6, wherein time periods of the first duration, the second duration, the third duration, and the fifth duration are the same.

12. The projector apparatus according to claim 3, wherein the second light emission pattern information comprises a fifth duration in which the light emitting elements of red, green, and blue simultaneously emit light.

13. The projector apparatus according to claim 12, further comprising:
a second acquiring unit configured to acquire a luminous intensity of a projection environment of the color image; and an adjusting unit configured to adjust a time period of the fifth duration.

14. The projector apparatus according to claim 13, wherein the second acquiring unit is configured to acquire a luminous intensity before and after projection of a color image, and to detect the luminous intensity of the projection environment of the color image based on a difference between the luminous intensities acquired before and after projection.

15. The projector apparatus according to claim 12, wherein the fifth duration is between fourth durations in which one of the light emitting elements emits light.

16. The projector apparatus according to claim 15, wherein the fifth duration is shorter than the fourth durations.

17. The projector apparatus according to claim 12, wherein time periods of the first duration and the fifth duration are the same.

18. A control method for a projector apparatus that includes light emitting elements of red, blue, and green, and projects a color image in a field sequential color system, the projector apparatus comprising a memory configured to store complementary color light emission pattern information and usual color light emission pattern information for a period of light emission by the light emitting elements, the complementary color light emission pattern information including one of a first duration in which only light emitting elements of red and green simultaneously emit light, a second duration in which only light emitting elements of green and blue simultaneously emit light, and a third duration in which only light emitting elements of red and blue simultaneously emit light, and the usual color light emission pattern information including a duration other than the first duration, the second duration, and the third duration, the control method comprising:
acquiring information indicative of whether color components of the color image include a complementary color component;

reading the complementary color light emission pattern information corresponding to the complementary color component included in the color components of the color image from the memory when information is acquired indicating that the color components of the color image include a complementary color component, and reading the usual color light emission pattern information when information is acquired indicating that the color components of the color image do not include a complementary color component; and controlling a light emission pattern for a period of light emission by the light emitting elements based on the read color light emission pattern information.

19. A non-transitory computer-readable medium having stored thereon a program that is executable by a computer for a projector apparatus that includes light emitting elements of red, blue, and green, and that projects a color image in a field sequential color system, the projector apparatus comprising a memory configured to store complementary color light emission pattern information and usual color light emission pattern information for a period of light emission by the light emitting elements, the complementary color light emission pattern information including one of a first duration in which only light emitting elements of red and green simultaneously emit light, a second duration in which only light emitting elements of green and blue simultaneously emit light, and a third duration in which only light emitting elements of red and blue simultaneously emit light, and the usual color light emission pattern information including a duration other than the first duration, the second duration, and the third duration, the program being executable by the computer to perform functions comprising:

acquiring information indicative of whether color components of the color image include a complementary color component;

reading the complementary color light emission pattern information corresponding to the complementary color component included in the color components of the color image from the memory when information is acquired indicating that the color components of the color image include a complementary color component, and reading the usual color light emission pattern information when information is acquired indicating that the color components of the color image do not include a complementary color component; and     controlling a light emission pattern for a period of light emission by the light emitting elements based on the read complementary color light emission pattern information.

20. The projector apparatus according to claim 1, wherein the memory is configured to store a plurality of complementary color light emission pattern information, and the reading unit is configured to read one of the plurality of complementary color light emission pattern information based on the complementary color included in the color components of the color image.

21. The projector apparatus according to claim 20, wherein the plurality of complementary color light emission pattern information comprise a different number of durations for emitting a complementary color.

\* \* \* \* \*